United States Patent [19]

Filipovich

[11] Patent Number: 5,229,598
[45] Date of Patent: Jul. 20, 1993

[54] NIGHT VISION GOGGLES HAVING ENLARGED FIELD OF VIEW AND INTERCHANGEABLE OPTICS

[75] Inventor: Danny Filipovich, Lincolnwood, Ill.

[73] Assignee: Night Vision General Partnership, Morton Grove, Ill.

[21] Appl. No.: 827,339

[22] Filed: Jan. 29, 1992

[51] Int. Cl.$^5$ .............................................. H01J 31/50
[52] U.S. Cl. ........................ 250/214 VT; 250/227.2; 313/524
[58] Field of Search .............. 250/213 VT, 227.2; 313/524, 526; 385/116; 359/480, 481, 482, 351, 353, 400, 643, 822, 828

[56] References Cited

U.S. PATENT DOCUMENTS

| | | | |
|---|---|---|---|
| 3,058,021 | 10/1962 | Dunn | 313/65 |
| 3,400,291 | 9/1968 | Sheldon | 250/227.2 |
| 4,076,978 | 2/1978 | Brennan et al. | 250/213 V T |
| 4,124,798 | 11/1978 | Thompson | 250/213 V T |
| 4,323,298 | 4/1982 | Brennan | 350/36 |
| 4,563,061 | 1/1986 | Ellis | 350/503 |
| 4,641,931 | 2/1987 | Loy | 250/213 V T |
| 4,653,879 | 3/1987 | Filipovich | 350/538 |
| 4,655,562 | 4/1987 | Kreitzer et al. | 350/538 |
| 4,904,049 | 2/1990 | Hegg | 350/96.27 |
| 5,079,416 | 1/1992 | Filipovich | 250/213 V T |

Primary Examiner—David C. Nelms
Assistant Examiner—K. Shami
Attorney, Agent, or Firm—Willian Brinks Olds Hofer Gilson & Lione

[57] ABSTRACT

Night vision apparatus, particularly night vision goggles, having a wide field of view. The apparatus includes an objective optical system having a selected field of view for collecting visible and/or infrared light from an object to be viewed and for providing an input image of the object; image intensifying and magnifying means for receiving the input image and for providing a visible, intensified and magnified output image of the input image, and an eyepiece optical system for receiving the visible, intensified and magnified output image and for presenting a visible intensified image of the object to an eye of a user at unity magnification. The image intensifying and magnifying means preferably comprises an image intensifier tube having a fiber optic bundle beam expander therein. The image intensifying and magnifying means permits the eyepiece optical system to have a longer focal length and, hence, to provide greater eye relief than would otherwise be possible. The goggles of the present invention can be provided in both see-thru and non-see-thru configurations and can be constructed in modular form to provide for interchangeability of objective optical systems providing varying fields of view with eyepiece optical systems providing either see-thru or a non-see-thru capability.

19 Claims, 3 Drawing Sheets

NIGHT VISION GOGGLES HAVING ENLARGED FIELD OF VIEW AND INTERCHANGEABLE OPTICS

BACKGROUND OF THE INVENTION

1. Field of the Invention

The present invention relates generally to night vision systems of the type which permit vision under very low light conditions by intensifying incoming infrared and/or visible light from a viewed object and converting the incoming light to an intensified visible light. More particularly, the invention relates to night vision goggles having an enlarged field of view and interchangeable objective and eyepiece optical systems to permit a user to select among a plurality of fields of view and eyepiece configurations.

2. Background Art

Many applications require the use of night vision systems having a relatively wide field of view. If no physical limitations were placed on the design, wide field of view systems could readily be constructed using state-of-the-art optical configurations. However, if the system comprises night vision goggles which are adapted to be worn upon the head of a user, such as by being secured directly on the head or by being mounted to a helmet; there are several important physical requirements which place significant constraints upon the optical design of the system.

For example, goggles worn upon the head of a user must be both compact and light in weight because excessive weight or front-to-back length can cause the goggles to exert large moments on the user's head causing severe instability problems and preventing their effective use in applications in which the user's head may be subjected to high gravitational or centrifugal loads. Furthermore, in a wide field of view optical system, the focal length of the eyepiece optics must be shortened correlatively with that of the wide angle objective for unity magnification; and, in night vision goggles, this results in insufficient eye relief between the eyepiece optics and the eye, which not only causes discomfort to the user, but also interferes with the ability to position a helmet visor, eyeglasses and other structures between the goggles and the eyes of the user.

Particularly because of the need for adequate eye relief, prior night vision goggles have generally been limited to providing a field of view of no more than about 40 degrees.

SUMMARY OF THE INVENTION

The present invention provides night vision apparatus, particularly, compact, lightweight, night vision goggles apparatus capable of providing an enlarged field of view of, for example, up to 60 degrees with improved visual acuity and sufficient eye relief. In accordance with the invention, the apparatus includes an objective optical system having a selected field of view for collecting incoming visible and/or infrared light from an object to be viewed, and for providing an input image of the object, image intensifying and magnifying means for receiving the input image and for providing a visible, intensified and magnified output image of the input image, and an eyepiece optical system for receiving the visible, intensified and magnified output image and for presenting a visible intensified image of the object to an eye of a user at unity magnification.

With the present invention, the image intensifying and magnifying means provides an intensified visible image of the object at the output end thereof which is also magnified relative to the input image from the objective lens system. As a result, the eyepiece optical system will have a focal length that is longer than would otherwise be required for the wide-angle objective, and the longer focal length will provide greater eye relief than would otherwise be available when the apparatus is adapted to be worn upon the head.

Thus, with the present invention, night vision goggles having an objective optical system providing any desired field of view up to, for example, 60 degrees can be utilized in conjunction with an eyepiece optical system that provides adequate eye relief to be comfortable to the user and to permit a visor, glasses or other structures to be positioned between the goggles and the user's eyes.

In accordance with a presently preferred embodiment, the image intensifying and magnifying means comprises an image intensifier tube for receiving the input image at an input end thereof and for providing a visible intensified output image at an output end thereof. The magnifying means comprises a fiber optic bundle beam expander in the image intensifier tube extending from the input end to the output end for magnifying the output image relative to the input image. The fiber optic bundle beam expander preferably has a resolution of about 56 line pairs/mm at the input end thereof to maintain adequate resolution at the output end to prevent coarseness of the output image.

As indicated above, the present invention can provide night vision goggles having an enlarged field of view of up to about 60 degrees with improved visual acuity. Depending on the application, a user might prefer goggles having a lesser field of view, for example, 40 degrees or 50 degrees, to obtain an even greater degree of visual acuity, to provide a larger eye relief or for another reason. Also, depending on a particular application, a user may prefer night vision goggles of the non-see-thru type in which only an intensified image of the object can be viewed, or of the see-thru type in which both an intensified image and an unintensified visible image of the object can be viewed.

In accordance with a further aspect of the invention, the night vision goggles of the present invention are designed to be in modular form with interchangeable components. This permits objective and eyepiece optical systems to be readily interchanged to provide a user with substantial flexibility in assembling systems which are most suitable for particular applications.

Further advantages and specific details of the invention will be set forth hereinafter in conjunction with the following detailed description of presently preferred embodiments.

DETAILED DESCRIPTION OF THE PREFERRED EMBODIMENTS

Figure 1:
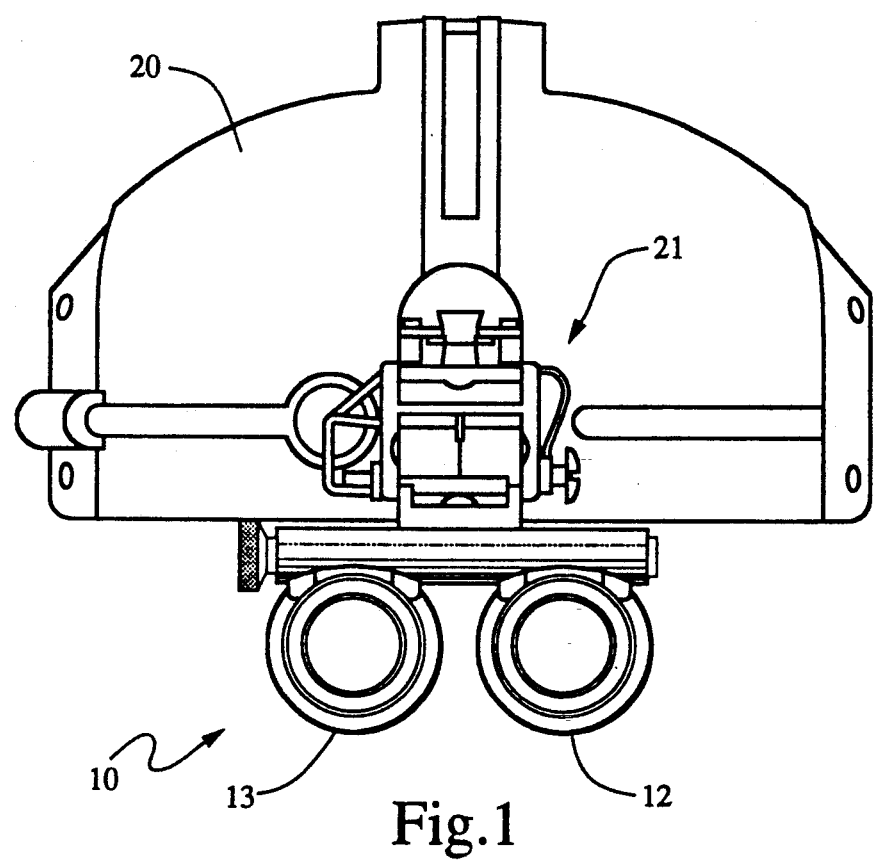
FIG. 1 is a schematic perspective view illustrating helmet-mounted night vision goggles according to a presently preferred embodiment of the invention.

FIG. 1 schematically illustrates helmet-mounted night vision goggles according to a presently preferred embodiment of the invention. The goggles are generally designated by reference number 10 and include a housing assembly comprising a pair of housings 12 and 13 arranged for respectively covering the left and right eyes of a user. The goggles are adapted to be attached to a helmet 20 to be worn by the user, and are mounted to the helmet by suitable mounting structure 21 that will permit the goggles to be conveniently raised up when not in use, or lowered in front of the eyes for use.

Each of housings 12 and 13 contain an identical optical system designed to receive light from an external object and to present an intensified visible image of the object to its respective eye of the user, and since the optical systems are identical, only one is described herein.

The goggles typically also include input ports to project HUD information and for other purposes, suitable power source couplings, and other structures which do not form a part of the present invention and are thus not described herein.

Figure 2:
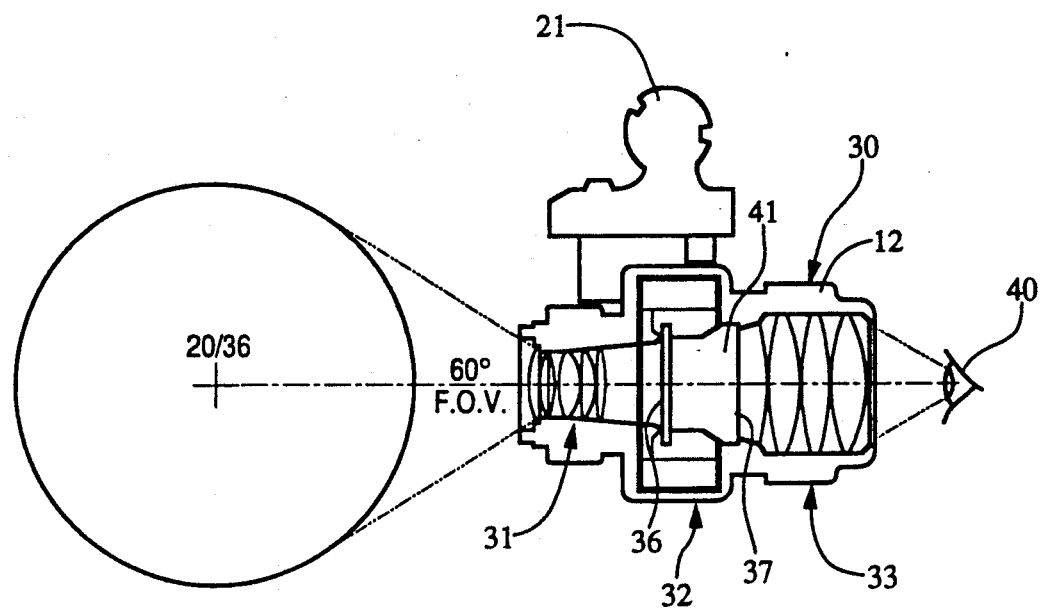
FIG. 2 is a schematic cross-sectional view of one housing of the goggles of FIG. 1.

FIG. 2 schematically illustrates a cross-sectional view of goggles housing 12 to illustrate the optical system therein. The optical system is designated by reference number 30 and generally includes an objective optical system 31, an image intensifier tube 32 and an eyepiece optical system 33.

The objective optical system 31 comprises a wide-angle lens group providing a desired field of view of, for example, 60 degrees and can be of conventional design. The objective optical system is adapted to collect light from an object being viewed and to present an image of the object to the input end or photocathode side 36 of the image intensifier tube 32. The image intensifier tube receives the visible and/or infrared light image at the input end thereof, and converts it to an intensified visible output image in a predetermined narrow band of wavelengths at the output end 37 thereof.

In a preferred embodiment, the image intensifier includes a GaAs photocathode at the input end, and the output light from the image intensifier is emitted by a green phosphor producing a visible band of light which is known as "P-20" light, although it will be appreciated that other image intensifier constructions could also be used.

The intensified, visible image at the output end of the image intensifier tube is applied to the eyepiece optical system 33 which includes a lens group for presenting an intensified visible image of the object to the eye 40 of the user at unity magnification.

The image intensifier tube 32 also includes a fiber optic bundle 41 for transmitting bits of image data from the photocathode input of the image intensifier to the phosphor output thereof. The fiber optic bundle is preferably twisted as illustrated in FIG. 2 to provide an image rotation of 180 degrees so that an upright image of the object will be presented to the eye of the viewer as known to those skilled in the art. In addition, the individual fibers of the fiber optic bundle are fanned out from the input end to the output end of the bundle so as to expand the beam passing through the bundle in order to provide a magnified, visible output image at the output end of the image intensifier tube. The eyepiece optical system 33, as indicated above, is designed to receive the magnified visible output image from the image intensifier tube and to present an intensified image of the object to the eye of the user at unity magnification.

Because the fiber optic beam expander 41 in the image intensifier tube magnifies the output image from the tube relative to the input image into the tube, the eyepiece optical system is required to further magnify the output image to lesser degree than would otherwise be necessary for unity magnification; and, hence, the eyepiece optical system will have a focal length that is longer than would otherwise be required for unity magnification in a wide field of view imaging system. As a result of its longer focal length, the eyepiece optical system provides greater eye relief to the user than would otherwise be possible in such imaging systems, and thus permits the effective use of night vision goggles having a wide field of view.

For example, an optical system having a field of view of 60 degrees would normally require objective and eyepiece optical systems having an Equivalent Focal Length (EFL) of about 17 mm; and an eyepiece optical system of such focal length will provide insufficient eye relief for use in night vision goggles.

In accordance with the present invention, however, although night vision goggles having a field of view of 60 degrees will also include a 17 mm EFL objective optical system; the eyepiece optical system will have an EFL of 22.8 mm and provide an eye relief of 18 mm which is fully sufficient for user comfort and to permit various structures to be readily inserted between the goggles and the eye.

The fiber optic beam expander 41 expands (magnifies) the input image from 18.5 mm at the input end of the image intensifier to 24 mm at the output end thereof (18.5 mm and 24 mm correspond to the focal lengths of the objective and eyepiece optical systems, respectively, corrected for distortion). The fiber optic bundle beam expander preferably also has a resolution of 56 line pairs/mm on the cathode side to provide satisfactory resolution at the enlarged output end thereof.

The night vision goggles constructed as described above has a visual acuity of 20 (day)/36 (night) which is actually better than the visual acuity of many conventional night vision goggles systems having only a 40-degree field of view.

FIGS. 1 and 2 illustrate night vision goggles of the non-see-thru type in which only intensified light is directed to the eyes of the user. The present invention can also be utilized in see-thru systems in which both intensified light and unintensified visible light is directed to the eyes of the user, and FIG. 3 schematically illustrates an embodiment of the present invention having a see-thru capability.

Figure 3:
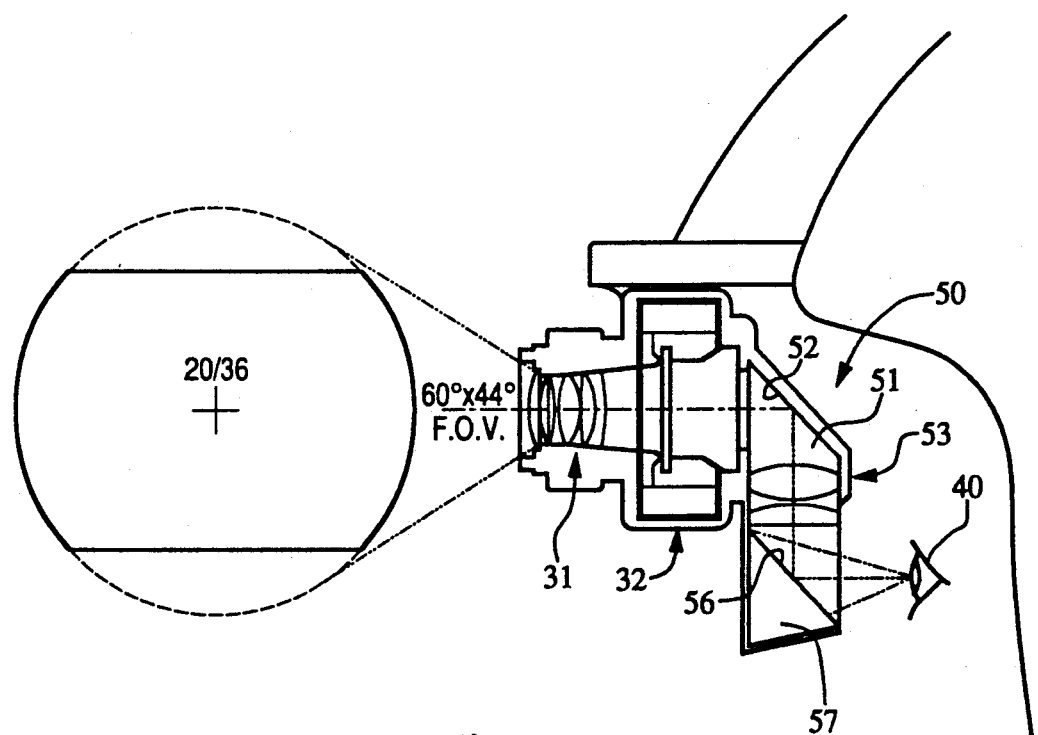
FIG. 3 is a cross-sectional view illustrating one housing of night vision goggles according to a second embodiment of the invention.

In FIG. 3, the objective optical system 31 and the image intensifier tube 32 are identical to those used in the non-see-thru embodiment of FIG. 2. The eyepiece optical system, however, has been modified to have a see-thru configuration. In particular, the eyepiece optical system 50 includes a first prism 51 for receiving the magnified, visible intensified light output image at the output end of the image intensifier tube. Prism 51 includes a totally reflecting surface 52 for reflecting the image downwardly through 90 degrees as illustrated in the Fig. through eyepiece lens system 53, and is then reflected off of partially reflecting surface 56 of prism 57 to present a visible intensified image of an object at unity magnification to the eye 40 of the user. At the same time, unintensified visible light from the object enters into goggles housing through a suitable input window, and passes through surface 56 of prism 57 directly to the eye 40 of the user so that both an intensified and an unintensified visible image of an object can be viewed by the user.

As indicated above, night vision goggles according to the present invention can be provided which have a field of view of up to, for example, 60 degrees, a visual acuity of 20/36, and eye relief of about 18 mm. For many applications, a user might prefer a system having a lesser field of view, for example, to obtain great visual acuity or larger eye relief.

The present invention permits night vision goggles to be easily provided having any desired field of view that may be required or preferred for particular applications. With the present invention, for example, a system having a field of view of 50 degrees provides a visual acuity of 20/30 and eye relief of 20 mm, while a system having a field of view of 40 degrees provides a visual acuity of 20/25 and eye relief of 25 mm. Furthermore, any desired field of view can be provided in either a see-thru or a non-see-thru version. Thus, the present invention provides a user with a great deal of flexibility in providing night vision goggles that would be most suitable for particular applications.

Figure 4:
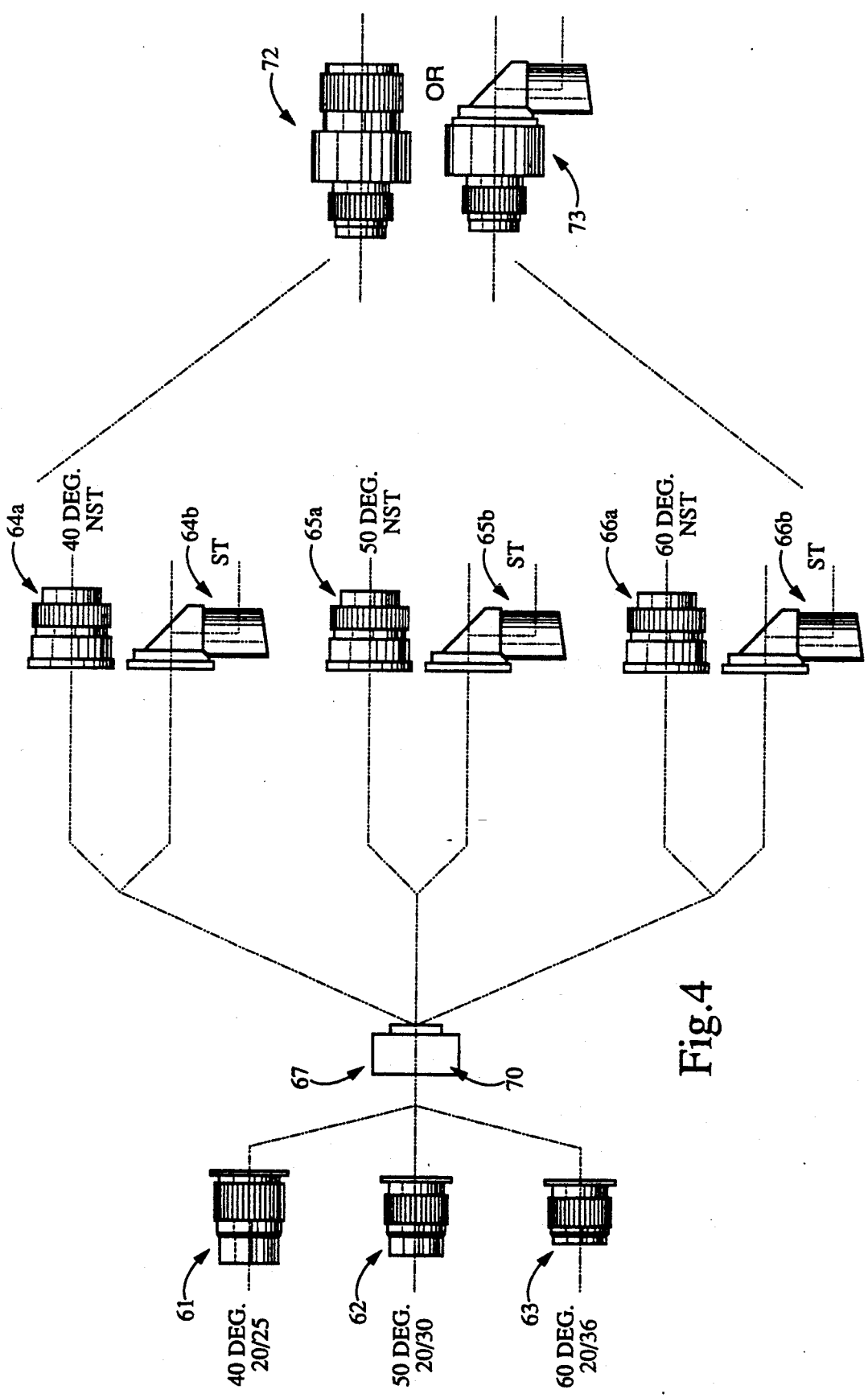
FIG. 4 illustrates the modular design and the interchangeability of components of night vision goggles of the present invention.

Irrespective of the field of view desired, or whether a see-thru or non-see-thru configuration is selected, it is to be noted that the image intensifier tube will be the same in each instance. Also, it should be noted that an objective optical system for a particular field of view can be used in either the see-thru or the non-see-thru versions, it being necessary to change only the configuration of the eyepiece optical system depending on the version to be used. The capability of using common components in various configurations permits the night vision goggles of the present invention to be designed in modular form with interchangeable components as illustrated in FIG. 4.

In particular, a complete night vision goggles system of the present invention can include a plurality of objective optical system subassemblies 61, 62 and 63 providing fields of view of, for example, 40 degrees, 50 degrees and 60 degrees, respectively; a plurality of eyepiece optical system subassemblies 64a and 64b, 65a and 65b and 66a and 66b in both non-see-thru and see-thru configurations, respectively, for each field of view; and a single image intensifier tube subassembly 67. The subassemblies are provided with suitable releasable connecting structure such as threaded connecting rings or the like as schematically illustrated at 70 to permit a particular objective optical system subassembly to be mounted to its associated eyepiece optical system subassembly and to an image intensifier tube subassembly to provide a complete housing assembly as illustrated at 72 and 73 in FIG. 4.

The modular and interchangeable design of the goggles housings permits desired goggles designs to be assembled and modified as needed in the field and as viewing requirements change. The design also permits damaged components of the goggles to be easily replaced without it being necessary to replace other components of the goggles; and because the subassemblies can be used in various different configurations, overall manufacturing costs and inventory requirements are reduced.

While what has been described constitutes presently preferred embodiments of the invention, it should be recognized that the invention can take many other forms. Accordingly, it should be understood that the invention should be limited only insofar as is required by the scope of the following claims.

I claim:

1. Night vision apparatus comprising:
   an objective optical system having a selected field of view for collecting visible and/or infrared light from an object to be viewed and for providing an input image of said object;
   an image intensifier for receiving the input image at an input end thereof and for providing a visible, intensified output image of said input image at an output end thereof, said image intensifier including magnifying means therein between said input end and said output end for providing a visible, intensified and magnified output image of said input image at said output end; and
   an eyepiece optical system for receiving the visible, intensified and magnified output image and for presenting a visible intensified image of the object to the eye of a user at unity magnification.

2. The night vision apparatus of claim 1 wherein said magnifying means includes a fiber optic bundle beam expander for magnifying said input image.

3. The night vision apparatus of claim 2 wherein said image intensifier comprises an image intensifier tube, and wherein said fiber optic bundle beam expander extends within said tube from said input end to said output end thereof for providing said visible, intensified and magnified output image at the output end of said tube.

4. The night vision apparatus of claim 1 wherein said selected field of view comprises a wide field of view of up to 60 degrees.

5. The night vision apparatus of claim 1 wherein said selected field of view comprises a field of view of 60 degrees, and wherein said magnifying means magnifies the input image by a factor of 1.3

6. The night vision apparatus of claim 5 wherein said objective optical system has a focal length of 17 millimeters and said eyepiece optical system has a focal length of 22.8 millimeters.

7. The night vision apparatus of claim 1 wherein said eyepiece optical system further includes means for directing unintensified visible light to the eye of the user.

8. The night vision apparatus of claim 1 wherein said apparatus comprises night vision goggles adapted to be worn upon the head of the user.

9. The night vision apparatus of claim 8 wherein said night vision goggles are adapted to be mounted on a helmet.

10. Night vision goggles comprising:
    an objective optical system having a selected field of view for collecting visible and/or infrared light from an object to be viewed;
    image intensifier means for receiving the collected light at an input end thereof and for providing an intensified visible image of said object at an output end thereof, said image intensifier means further including a fiber optic bundle beam expander for providing a magnified intensified visible image at the output end thereof; and
    an eyepiece optical system for receiving the magnified intensified visible image from the output end of the image intensifier means and for presenting an intensified visible image of the object to an eye of the user at unity magnification.

11. The night vision goggles of claim 10 wherein said selected field of view comprises a wide field of view of up to 60 degrees.

12. The night vision of goggles of claim 11 wherein said objective optical system has focal length of 17 millimeters and said eyepiece optical system has a focal length of 22.8 millimeters.

13. The night vision goggles of claim 10 wherein said eyepiece optical system further includes means for directing unintensified visible light to the eye of the user.

14. A night vision system comprising:
   at least one objective optical system subassembly for collecting visible and/or infrared light from an object to be viewed;
   an image intensifier subassembly for receiving the collected light at an input end thereof and for providing an intensified visible image of said object at an output end thereof;
   at least one eyepiece optical system subassembly for receiving the intensified visible image from the output end of the image intensifier subassembly and for presenting a visible intensified image of the object to an eye of a user; and
   means for releasably coupling one of the at least one objective optical system subassemblies, the image intensifier subassembly and one of the at least one eyepiece optical system subassemblies to one another.

15. The system of claim 14 wherein said at least one eyepiece optical system subassembly includes a non-see-thru eyepiece optical system subassembly and a see-thru eyepiece optical system subassembly.

16. The system of claim 14 wherein said at least one objective optical system subassembly includes a plurality of objective optical system subassemblies each having a different field of view.

17. The system of claim 16 wherein said at least one eyepiece optical system subassembly includes a non-see-thru eyepiece optical system subassembly and a see-thru eyepiece optical system subassembly for each of said at least one objective optical system subassemblies.

18. The system of claim 14 wherein said image intensifier subassembly includes an image intensifier tube having magnifying means for providing a magnified, intensified visible image at an output end thereof; and wherein each of said at least one eyepiece optical system subassemblies include means for receiving the magnified, intensified visible image and for presenting an intensified visible image of the object to an eye of a user at unity magnification.

19. The system of claim 14 wherein said magnifying means comprises a fiber optic bundle beam expander.

* * * * *